No. 662,552. Patented Nov. 27, 1900.
J. ST. MARY.
STEAM TRAP.
(Application filed Aug. 9, 1900.)
(No Model.)
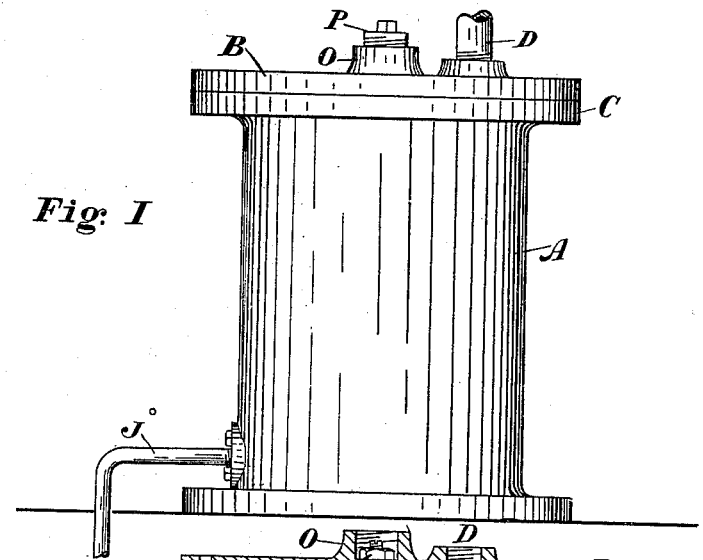
Fig. I
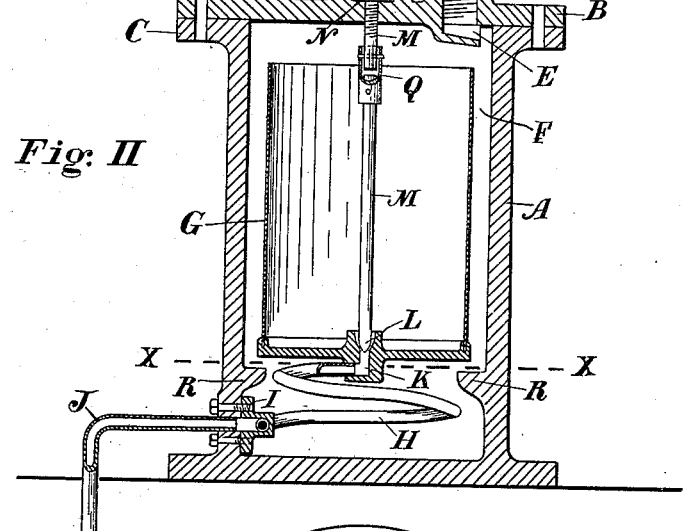
Fig. II
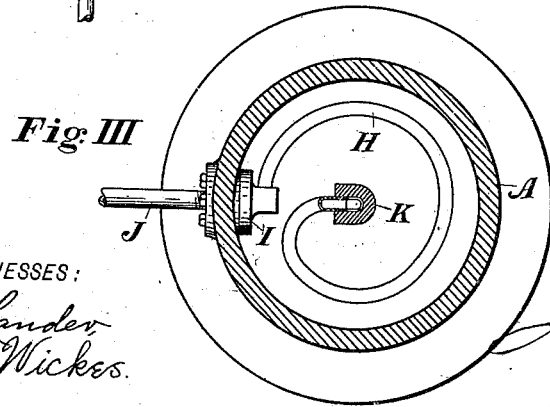
Fig. III
WITNESSES:
O. W. J. Lander
Elmer Wickes.
INVENTOR
Joseph St. Mary
BY
J. Richards & Co.
ATTORNEYS.
THE NORRIS PETERS CO., PHOTO-LITHO., WASHINGTON, D. C.

UNITED STATES PATENT OFFICE.

JOSEPH ST. MARY, OF SAN FRANCISCO, CALIFORNIA, ASSIGNOR TO GEORGE M. MAHONEY, OF SAME PLACE.

STEAM-TRAP.

SPECIFICATION forming part of Letters Patent No. 662,552, dated November 27, 1900.

Application filed August 9, 1900. Serial No. 26,391. (No model.)

*To all whom it may concern:*

Be it known that I, JOSEPH ST. MARY, a citizen of the United States of America, residing at San Francisco, county of San Francisco, and State of California, have invented certain new and useful Improvements in Steam-Traps; and I hereby declare the following to be a full, clear, and exact description of the same, reference being had to the accompanying drawings, forming a part of this specification.

This invention relates to traps for collecting and discharging at intervals water of condensation from steam pipes or vessels and to certain improvements in such traps.

The invention consists in a main containing vessel and therein an open-mouthed float mounted or poised on a coiled resilient pipe that performs the function of sustaining and guiding the float and also that of a conduit for the water of condensation that passes into the float vessel, which water rises to some predetermined point therein and until the weight of this water depresses the float, thereby opening a valve in its bottom, permitting the water in the float to escape at intervals, as is desirable in such apparatus.

The objects of this invention are to provide in a steam-trap an open float vessel that will move without friction or rubbing contact of any kind, to attain the desired operating functions without any loose members within the main containing vessel, to provide a valve adjustable from the outside and without removing any of the parts when the trap is under pressure, and to shorten the range of the valve, so it will not be subject to concussion or wear. To these ends I construct steam-traps as illustrated in the drawings herewith, in which—

Figure I is an elevation of a steam-trap made according to and embodying my improvements. Fig. II is a vertical section through the axis of Fig. I in the same plane of view. Fig. III is a cross-section through Fig. I on the line *x x*.

The operation of my improved steam-trap is exceedingly simple, the float vessel being the only moving part, and this without sliding bearings or movable joints of any kind.

The main containing vessel A is a plain cylinder, with a removable cover B attached to a flange C on the main vessel in the usual manner. In this covering-plate B is an inlet-way at D, through which steam and water of condensation enter by means of a pipe D, connecting to heating or other steam apparatus to be drained.

On the inside of the cover B is provided a passage E, by which the entering water is caused to fall within the annular space F around the float vessel G. This float vessel G, as seen in Fig. II, is a plain cylinder open at the top, consequently is not subjected to pressure, and can be made thin and light in weight, and is thus adapted for high pressures. This float vessel G is mounted on and rigidly attached to a resilient coiled pipe H, as seen in Fig. II, that is in turn rigidly attached to a flange I and connects with a discharge-pipe J, through which water of condensation is discharged.

The coiled pipe H communicates with the interior of the float vessel G, as seen in Fig. II, through a passage K, which passage is opened and closed by a pointed valve L, formed on the end of the rod M. This rod M passes upward through the cover B and is screw-threaded therein, so as to be vertically adjustable from the outside of the main vessel when the trap is in operation, a jam-nut N preventing the rod from turning after adjustment is made. The stem is slotted at the top, as shown in Fig. II, to receive a screwdriver, or can be squared to receive a socket-key. To prevent the possible escape of steam around the screw-threaded portion of the stem M, I provide a hollow nipple O, closed by a common screw-plug P. To permit the stem some freedom of movement laterally, so the valve-point L will settle fairly on its seat, I separate the stem into two parts and connect these parts by a sleeve Q, held by cross-pins, as seen in Fig. II. The bore of this sleeve being a little larger than the diameter of the stem M permits the required lateral adjustment of the latter to its seat.

The operation is as follows: The pipe D being connected to steam apparatus of any kind to be drained, the main vessel A is filled with water up to or near the top of the float vessel G, so its buoyancy will cause an upward strain and a slight movement of the coil-pipe H. The stem M is then set downward until the valve L is seated. When the water of condensation enters, this after completely filling the main vessel A pours over the top of the float vessel G until that fills up to some predetermined point, preferably nearly to the top. Then this vessel sinks by gravity, opening the valve L and permitting a portion of the water in the float vessel G to escape through the coil-pipe H and the discharge-pipe J. This discharge goes on until the buoyancy of the float vessel G causes it to again rise and close the valve L, this operation going on intermittently as water is collected.

The ledges R are to prevent injury to the coil-pipe H by forcible depression of the float vessel G. The float vessel G being open is not subject to external pressure or to the usual derangement of inclosed floats by the entry of water under high pressures. The float G resting on the flexible and elastic coil-pipe H and being otherwise wholly out of contact moves free and with precision.

Having thus explained the nature and objects of my invention, what I claim as new, and desire to secure by Letters Patent, is—

1. In a steam-trap, a main containing vessel, an open float vessel therein, the latter poised and held by a coiled elastic pipe so as to move vertically without contact and thereby operate a valve in its bottom in the manner and for the purposes substantially as specified.

2. In a steam-trap, a main containing vessel, an open float therein, a flexible discharge-pipe on which the float is mounted and with which it communicates, an escape-passage in the bottom of the float and a fixed valve that opens and closes by the float's vertical movement, arranged and operating in the manner and for the purpose substantially as described.

3. In a steam-trap the combination of the flexible discharge-pipe H, the float G mounted thereon and supported thereby and the stationary stem M forming a valve to open and close a discharge-passage in the bottom of the float, operating in the manner and for the purposes substantially as specified.

In testimony whereof I have signed my name to this specification in the presence of two subscribing witnesses.

JOSEPH ST. MARY.

Witnesses:
P. W. J. LANDER,
ELMER WICKES.